US011018372B2

(12) United States Patent
Ceder et al.

(10) Patent No.: US 11,018,372 B2
(45) Date of Patent: May 25, 2021

(54) INTERLAYER SODIUM ELECTRODES FOR SODIUM ION BATTERIES

(71) Applicant: The Regents of the University of California, Oakland, CA (US)

(72) Inventors: Gerbrand Ceder, Orinda, CA (US); YaoSen Tian, Emeryville, CA (US); YingZhi Sun, Berkeley, CA (US); Daniel C. Hannah, Oakland, CA (US); Shou-Hang Bo, Shanghai (CN)

(73) Assignee: The Regents of the University of California, Oakland, CA (US)

( * ) Notice: Subject to any disclaimer, the term of this patent is extended or adjusted under 35 U.S.C. 154(b) by 60 days.

(21) Appl. No.: 16/297,385

(22) Filed: Mar. 8, 2019

(65) Prior Publication Data

US 2019/0280326 A1     Sep. 12, 2019

Related U.S. Application Data

(60) Provisional application No. 62/640,943, filed on Mar. 9, 2018.

(51) Int. Cl.
| | | |
|---|---|---|
| *H01M 10/054* | (2010.01) | |
| *H01M 10/0562* | (2010.01) | |
| *H01M 4/34* | (2006.01) | |
| *H01M 4/38* | (2006.01) | |
| *H01M 4/583* | (2010.01) | |
| *H01M 4/133* | (2010.01) | |
| *H01M 4/66* | (2006.01) | |
| *H01M 10/058* | (2010.01) | |
| *H01M 4/134* | (2010.01) | |
| *H01M 4/02* | (2006.01) | |

(52) U.S. Cl.
CPC ......... *H01M 10/054* (2013.01); *H01M 4/133* (2013.01); *H01M 4/134* (2013.01); *H01M 4/381* (2013.01); *H01M 4/583* (2013.01); *H01M 4/661* (2013.01); *H01M 10/058* (2013.01); *H01M 10/0562* (2013.01); *H01M 2004/028* (2013.01)

(58) Field of Classification Search
None
See application file for complete search history.

(56) References Cited

U.S. PATENT DOCUMENTS

| | | | | |
|---|---|---|---|---|
| 2014/0099539 A1* | 4/2014 | Yamazaki | ............. | C01B 33/113 429/211 |
| 2014/0205883 A1* | 7/2014 | Wang | ....................... | C01D 1/02 429/144 |
| 2018/0241026 A1* | 8/2018 | Shibutani | ............ | H01M 10/058 |

OTHER PUBLICATIONS

Tian et al., Reactivty-Guided Interface Design in Na Metal Solid State Batteries, Joule, 3, 1037-1050, Apr. 17, 2019 (Year: 2019).*
Xiao et al., "Understanding interface stability in solid-state batteries," Nature Reviews | Materials, www.nature.com/natrevmats, Published online Dec. 9, 2019 (Year: 2019).*

* cited by examiner

*Primary Examiner* — Amanda J Barrow
(74) *Attorney, Agent, or Firm* — Gavrilovich, Dodd & Lindsey LLP (57) ABSTRACT

A sodium-ion battery includes an electrode and a passivation layer on the electrode material.

16 Claims, 7 Drawing Sheets

Na$_3$SbS$_4$
P-42$_1$c (#114)
a = b = 7.1679(4) Å, c = 7.2974(7) Å

FIG. 2A

Na$_3$SbS$_4$·8H$_2$O
P12$_1$/c1 (#14)
a = 8.7454(7) Å, b=13.1655(11) Å, c=13.9049(12) Å
β=103.283(7)°

INTERLAYER SODIUM ELECTRODES FOR SODIUM ION BATTERIES

RELATED APPLICATIONS

This application claims the benefit of U.S. Provisional Patent Application Ser. No. 62/640,943, filed Mar. 9, 2018, the disclosures of which are incorporated herein by reference.

FIELD

The disclosure relates to batteries and more particularly to alternatives to lithium ion batteries.

BACKGROUND

Lithium-ion batteries have become a leading technology for energy storage in portable and automotive applications. Other battery technologies have also been developed as alternatives to lithium-ion batteries. Sodium-ion batteries are an example of an alternative that uses sodium ions as charge carriers rather than lithium ions. Since sodium is more abundant than lithium, these batteries may be cheaper to produce than lithium-ion batteries.

SUMMARY

The disclosure provides a sodium-ion battery, comprising an electrode having an active material; an interlayer comprising a passivation function; and a solid electrolyte medium in contact with a passivation layer. In one embodiment, the solid electrolyte material has the general formula $Na_3AX_4$ (A=P or Sb, X=S or Se). In a further embodiment, the interlayer comprises the general formula $Na_3AX_4 \cdot 8H_2O$ (A=P or Sb, X=S or Se). In yet another or further embodiment, the solid electrolyte is $Na_3SbS_4$ and the interlayer is $Na_3SbS_{4\cdot b} \, {}_8H_2O$. In another embodiment, the electrode is a positive electrode or a cathode. In still another embodiment, the battery is made by preparing a solid electrolyte material; exposing the solid electrolyte material to an environment under conditions to obtain a passivation layer on the solid electrolyte material; placing/layering an anode Na metal electrode material in contact with the passivation layer; placing/layering a cathode electrode material in contact with the passivation layer; placing a current collector on each of the cathode electrode material and the anode Na metal electrode material. In another embodiment, the cathode material is a carbon or graphite. In still another embodiment, the current collector material is Cu, Al, or steel. The disclosure also provides a system comprising a batter of the disclosure and electronics for controlling the discharge of the battery.

DESCRIPTION

As used herein and in the appended claims, the singular forms "a," "an," and "the" include plural referents unless the context clearly dictates otherwise. Thus, for example, reference to "a sodium ion" includes a plurality of sodium ions and reference to "the electrode material" includes reference to one or more electrode materials and equivalents thereof known to those skilled in the art, and so forth.

Also, the use of "or" means "and/or" unless stated otherwise. Similarly, "comprise," "comprises," "comprising" "include," "includes," and "including" are interchangeable and not intended to be limiting.

It is to be further understood that where descriptions of various embodiments use the term "comprising," those skilled in the art would understand that in some specific instances, an embodiment can be alternatively described using language "consisting essentially of" or "consisting of."

Unless defined otherwise, all technical and scientific terms used herein have the same meaning as commonly understood to one of ordinary skill in the art to which this disclosure belongs. Although any methods and reagents similar or equivalent to those described herein can be used in the practice of the disclosed methods and compositions, the exemplary methods and materials are now described.

All publications mentioned herein are incorporated herein by reference in full for the purpose of describing and disclosing the methodologies, which are described in the publications, which might be used in connection with the description herein. With respect to any term that is presented in one or more publications that is similar to, or identical with, a term that has been expressly defined in this disclosure, the definition of the term as expressly provided in this disclosure will control in all respects.

The increasing demand for high-quality rechargeable batteries has promoted the development of low-cost alternatives to lithium batteries. Sodium (Na) batteries are particularly promising in this regard. Extremely high energy densities in sodium batteries can be attained if cells utilizing metallic sodium anodes can be successfully constructed. However, the usage of Na metal anodes requires the suppression of dendritic Na growth during battery operation, which if such dendritic growth occurs can lead to catastrophic failure. The use of a ceramic solid-state electrolyte membrane in lieu of the commonly employed liquid electrolyte is a promising solution that can result in greatly enhanced battery safety.

Thanks to the high room temperature ionic conductivity and low grain-boundary resistance of sulfide and selenide compounds, $Na_3AX_4$ (A=P or Sb, X=S or Se) have attracted significant attention as excellent candidates for electrolytes in solid state sodium metal batteries. Among these superionic conductors, $Na_3SbS_4$ was found to exhibit the highest Na-ion conductivity of 3 mS cm$^{-1}$. However, it is observed that all $Na_3AX_4$ are not chemically stable against Na metal anode. This aligns well with computational results, which predict all $Na_3AX_4$ solid electrolytes (SE) are incompatible with Na metal and will spontaneously decompose into $Na_2X$ and $Na_3A$. The continuous decomposition of $Na_3AX_4$ generates a growing mixed-conducting interphase (MCI), which can substantially degrade the long-term cycling performance of the solid-state battery.

The disclosure provides a stable solid electrolyte-Na interface (permeable to ions but insulating to electrons) engineered by introducing selective elements in the Na conductor which react to form passivating interfaces. Using advanced first-principles computational tools, which accurately predict ionic mobility and decomposition products, the disclosure identified compounds predicted to form favorable interfaces while also exhibiting high Na-ion conductivity. This led to the identification of hydrate based compounds as a class of materials which could form passivating interfaces with Na metal, because the reaction of hydrates with Na metal will almost always produce compounds such as NaH, $Na_2O$ and/or NaOH, which are known to be ionically conductive and electronically insulating on the basis of both experimental measurements and theoretical modeling.

The disclosure provides a hydrate/passivation layer on the SE to provide a protection layer between the Na metal and the SE. For example, the disclosure demonstrates that $Na_3SbS_4 \cdot 8H_2O$ can form a stable and passivating solid electrolyte interphase (SEI), and can be used as a protection layer between Na metal and the solid-state electrolyte. The fast ionic conductivity of the SEI permits facile Na-ion transport, and the electronically insulating nature of the SEI inhibits electronic transport and further decomposition of $Na_3SbS_4 \cdot 8H_2O$, preventing the growth of the interface. The disclosure demonstrates that $Na_3SbS_4 \cdot 8H_2O$ can be synthesized with a standard solid-state reaction. The disclosure also shows that using $Na_3SbS_4 \cdot 8H_2O$ as a protection layer between the $Na_3SbS_4$ solid electrolyte and Na metal, a stable SEI with smaller interfacial resistance can be generated. The "hydrate-coated" solid electrolyte (e.g., $Na_3SbS_4SE$) delivers much higher stability against Na metal and enables better cycling of the Na metal symmetric cell compared with that of any non-hydrated $Na_3AX_4$ conductor as the SE. The results demonstrate the presence of both the protection layer of $Na_3SbS_4 \cdot 8H_2O$ and the passivating SEI in the post-operando solid-state symmetric cell after more than 25 hours of cycling and 10 days of resting.

The moisture stability of $Na_3AX_4$ has previously been characterized, but has never been studied in the context of the hydration process and the formation of a passivating SEI of the hydrate phases. The disclosure enables a passivating and stable SEI via a reaction at the anode/SE interface—no anode modifications are needed. This achievement comes from the understanding of the newly discovered intermediate hydrate phase $Na_3SbS_4 \cdot 8H_2O$. From this particular case, a general strategy for SE protection can be derived: the inclusion of a hydrated protection layer prevents SE decomposition to mixed-conducting phases by reacting with the Li/Na metal anode to form products which are electronically insulating while still permitting Li/Na ion transport. One application of the disclosure will be a stable interface between the SE and metal electrode in Li-ion and Na-ion batteries. This disclosure also opens up a window for chemistry using other atmospheres (i.e. $CO_2$, $SO_2$, HCl, $CH_3OH$, etc.) to perform surface treatment of the SE to form a protection layer.

The disclosure demonstrates a stabilized interface between the sulfide conductor $Na_3SbS_4$ and Na metal by the formation of NaH and $Na_2O$ through air exposure of the solid electrolyte pellet for a certain duration. The fast phase transformation between $Na_3SbS_4$, $Na_3SbS4 \cdot 8H_2O$, and $Na_3SbS_4 \cdot 9H_2O$ in ambient air at room temperature suggests the fast reaction kinetics of water uptake and release, which may have led to the generation of NaH and $Na_2O$ over other products from the reduction of Sb when the hydrated compounds contacted Na metal. In fact, the stability between $Na_3SbS4$ and Na metal might have been achieved accidentally without realizing the effect of hydrate protection.

Figure 7A:
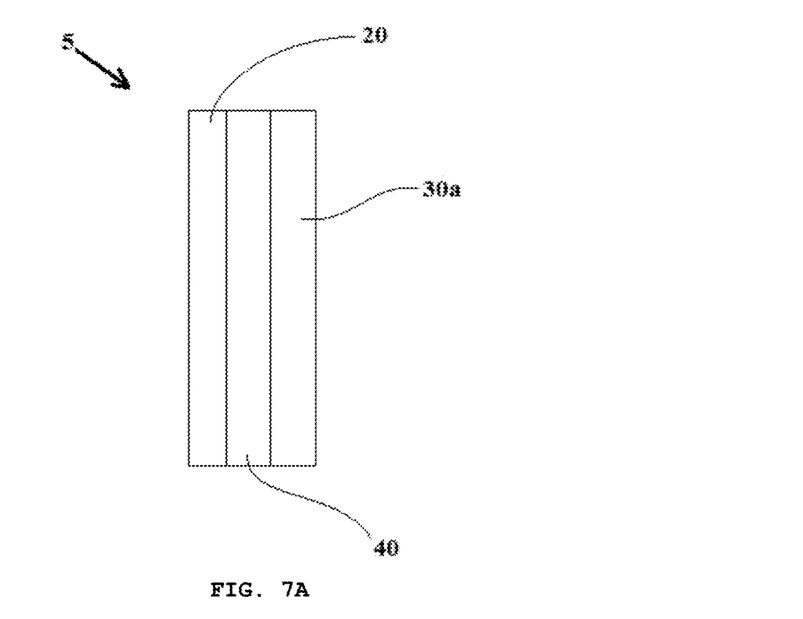
FIG. 7A-B shows (A) and anode element of the disclosure and (B) a diagram of a battery of the disclosure.

FIG. 7A depicts an anode 5 of the disclosure. Anode 5 comprises a Na-metal electrode layer 30a. The Na-metal layer 30a is in contact with an interlayer 40 that serves as a stable, passivation layer that has fast ionic conductivity for facile Na-ion transport while being electronically insulating to inhibit decomposition of the Na-metal electrode material. In one embodiment the interlayer is a hydrated layer of solid electrolyte material. For example, the interlayer can have the general formula $Na_3AX_4 \cdot 8H_2O$. This interlayer 40 is in contact with a solid electrolyte material 20. The solid electrolyte material can be $Na_3AX_4$ (A=P or Sb, X=S or Se). In one embodiment, the solid electrolyte 20 is $Na_3SbS_4$ and the interlayer 40 is $Na_3SbS_4 \cdot 8H_2O$.

Figure 7B:
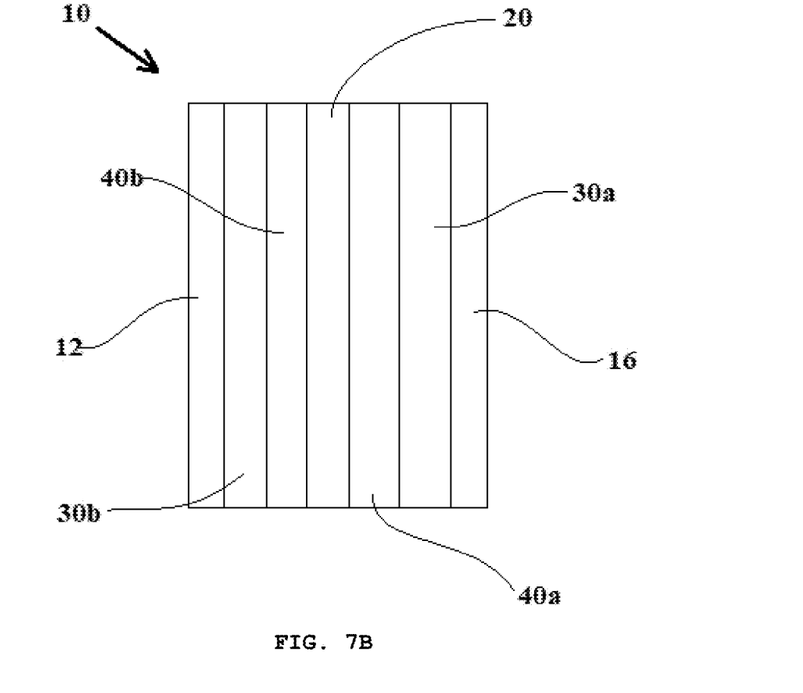

FIG. 7B shows an electrode assembly 10. In this depiction a solid electrolyte material 20 is contacted on each side by interlayer(s) 40a and 40b (interlayer 40b is optional). The solid electrolyte material 20 can be $Na_3AX_4$ (A=P or Sb, X=S or Se). The interlayer(s) 40a and 40b comprise a stable passivation layer. In one embodiment, the interlayer(s) is/are a hydrated layer of solid electrolyte material (e.g., $Na_3AX_4 \cdot 8H_2O$). The cathode 30b can be a Na-metal based cathode material, carbon or graphite material and the anode 30a can be the same as or a different Na-metal based material. Also shown are current collectors 12 and 16. The negative current collector 12 is configured to provide an electrical pathway between the negative active medium/cathode 30b and the terminals of an electrochemical device. Suitable negative current collectors 12 include, but are not limited to, Al, Cu, and steel. Suitable negative current collectors 12 include, but are not limited to, a foil, a net, a mesh, or a plate. The negative active medium 10 can include or consist of one or more negative active materials. Suitable negative active materials include, but are not limited to, carbon, graphite, and sodium metal. The positive electrode includes a positive active medium/anode 30a on a positive current collector 16. The positive current collector 16 provides an electrical pathway between the positive active medium/anode 30a and a terminal of an electrochemical device. A battery comprising the electrode assembly of the disclosure can be a primary or a secondary battery. Suitable materials for the positive current collectors 16 include, but are not limited to, aluminum and steel. Suitable positive current collector 16 include, but are not limited to, a foil, net, mesh, or plate.

The battery can be included in a system that includes electronics in electrical communication with the battery. The electronics can monitor and control discharge and/or charging of the battery. For instance, the electronics can stop discharge of the battery in response to the voltage of the battery falling below a voltage threshold. Suitable voltage thresholds include, but are not limited to, thresholds less than 2.0 V.

Suitable electronics include, but are not limited to, firmware, hardware and software or a combination thereof. Examples of suitable electronics include, but are not limited to, analog electrical circuits, digital electrical circuits, processors, microprocessors, digital signal processors (DSPs), computers, microcomputers, ASICs, and discrete electrical components, or combinations suitable for performing the required control functions. In some instances, the electronics include one or more memories and one or more processing units such as a CPU. The one or more memories can include instructions to be executed by the processing unit during performance of the control and monitoring functions.

Examples

To synthesize $Na_3SbS_4.8H_2O$, $Na_2S$ (Alfa Aesar, 99.8%), antimony (Sigma-Aldrich, 99.5% trace metals basis), and sulfur (Sigma-Aldrich, 99.5%) were used as precursors. A stoichiometric amount of powder precursors was mixed in an argon-filled glovebox. The resulting mixture (~1 g) was then placed into a boron-nitride (BN) tube (3 mm inner diameter and 4 mm outer diameter), which was wrapped in aluminum foil, with the open end sealed with a stainless-steel Swagelok cap (⅜ in.). This tube was transferred into a sealed alumina tube furnace, which was purged with a pre-dried Ar gas (oxygen/moisture traps, model MT200-4-D, Agilent). The furnace was quickly ramped to 550° C. within ~30 min, and was held at the same temperature for 17 h to complete the reaction. During the reaction, a continuous flow of argon gas with a flow rate of approximately 50 mL min$^{-1}$ was used. The resulting products were collected after the furnace was naturally cooled down to room temperature, and were transferred immediately into the glovebox and manually ground into powder. The resulting powder ($Na_3SbS_4$) was exposed to ambient air (humidity~68%) for 5 mins under continuous grinding with a mortar and pestle. Final products were collected and transferred into the glovebox for further characterization.

To observe the process of the phase transformation from $Na_3SbS_4$ to $Na_3SbS_4.8H_2O$, X-ray diffraction (XRD) patterns were collected from the $Na_3SbS_4$ powder sample at various times during 120 minutes of air exposure. XRD experiments were performed at beamline 11-ID-B at the Advanced Photon Source (APS) of Argonne National Laboratory and utilized a constant wavelength of 0.1432 Å. The use of high-energy X-rays (E=86.57 keV) minimizes absorption effects. Due to the moisture sensitivity of $Na_3SbS_4.8H_2O$, the as-prepared powder was packed and sealed into a 0.435 in. diameter Kapton capillary. For structure determination of $Na_3SbS_4.8H_2O$, the Rietveld refinements were performed using the TOPAS 5.0 software package (Bruker).

To investigate the effect of $Na_3SbS_4.8H_2O$ on the improvement of the $Na/Na_3SbS_4$ interface, symmetric $Na/Na_3SbS_4/Na$ cells with and without a $Na_3SbS_4.8H_2O$ protection layer were prepared and evaluated by Electrochemical Impedance Spectroscopy (EIS) to examine the interfacial resistance. To prepare the samples for EIS and electrochemistry analysis, ~140 mg of $Na_3SbS_4$ powder was cold pressed under a pressure of ~1.5 tons for 5 min into a pellet within an in-house designed pressure cell (7.7 mm inner diameter) in an argon glovebox. The resulting pellet (~1 mm of thickness) was exposed to ambient air (humidity ⊇68%) for ~5 min in order to achieve a hydrate coating ($Na_3SbS_4.8H_2O$) on the $Na_3SbS_4$ pellet. Two metallic Na foils (6 mm diameter and <50 μm thickness) were then carefully attached on both sides. Both cells were assembled under an Ar atmosphere with otherwise identical procedures and used $Na_3SbS_4$ from the same batch of sintered powder to maximize consistency. Samples were measured with EIS at room temperature (~25° C.) immediately after cell assembly. The EIS measurements were performed with a Solartron MTS system. The impedance data were collected from 1 MHz to 100 mHz with a D.C. voltage amplitude of 10 mV. The symmetric cells were then cycled with a constant current density of 0.1 mA/cm$^2$ at room temperature for 25 hours using an Arbin battery cycler (model MSTAT). During cycling, the current direction was reversed every 30 mins. A spring pressure (~3 MPa of pressure) was held within the pressure cells during cycling.

For phase determination of the products in the Na/SE interface, the spatially resolved post-operando X-ray diffraction patterns of the symmetric cells were collected at beamline 11-ID-B at APS using the Radially Accessible Tubular In-situ X-ray (RATIX) cell adapted for X-ray transmission. Cells were prepared in an Ar atmosphere glovebox using the same materials as for the pressure cell measurements. The $Na_3SbS_4$ pellets (3 mm diameter and ~0.05 cm in thickness) with and without a $Na_3SbS_4.8H_2O$ protective layer were sandwiched between Na metal (1 mm diameter and <0.005 cm in thickness) and then sealed by Kapton tape. The assembled RATIX cells were cycled under the same conditions and were allowed to rest for 7 days before XRD measurements. The RATIX cell was oriented perpendicularly to the X-ray beam ($\lambda$=0.1432 Å). The detector was positioned at a distance of 95 cm from the sample. To increase the mapping resolution, the size of the beam was reduced to 50 μm in the cell (vertical) direction, but remained large (500 μm) in the perpendicular (horizontal) direction. The acquisition time for each diffraction pattern was 1 s, and diffraction patterns were measured consecutively at 11~12 positions from top to bottom of the cell (FIGS. 5b and 6b).

Background measurements were taken using identical cells, but without the testing materials present. A $CeO_2$ standard was used to determine the sample geometry and the sample-to-detector distance. The data were integrated to a function of intensity vs. 2θ using FIT2D. Standard corrections (background, Compton scattering, detector effects) were applied, and Rietveld refinements were performed using the TOPAS 5.0 software package (Bruker).

Figure 1A:
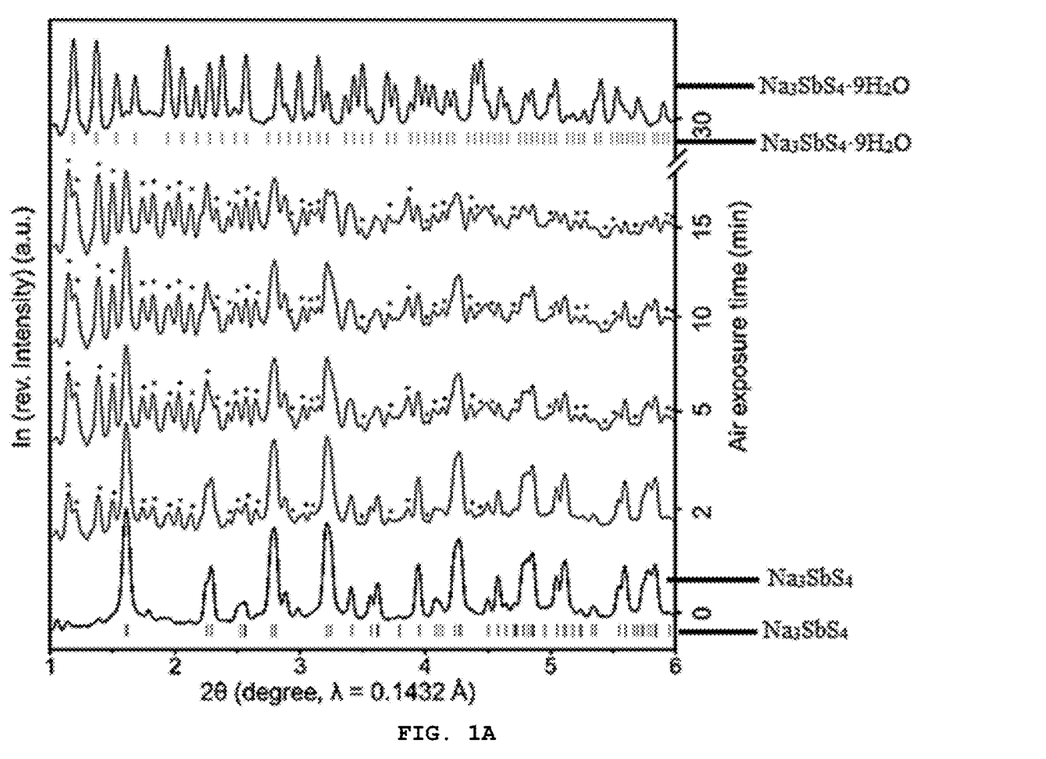
FIG. 1A-B show (A) the X-ray diffraction patterns of $Na_3SbS_4$ following different durations of air exposure, with the tick marks showing the allowed peak positions for $Na_3SbS_4$ and $Na_3SbS_4 \cdot 9H_2O$. Visible peaks for $Na_3SbS_4 \cdot 8H_2O$ are marked by dots. (B) Shows the X-ray diffraction pattern and the Ritveld refinement of $Na_3SbS_4$ following 15 minutes of air exposure. The dots indicate the observation intensities and the curve indicates the calculated fitting intensities, and the tick marks indicate the allowed peak positions for $Na_3SbS_4$ and $Na_3SbS_4 \cdot 8H_2O$.
Figure 1B:
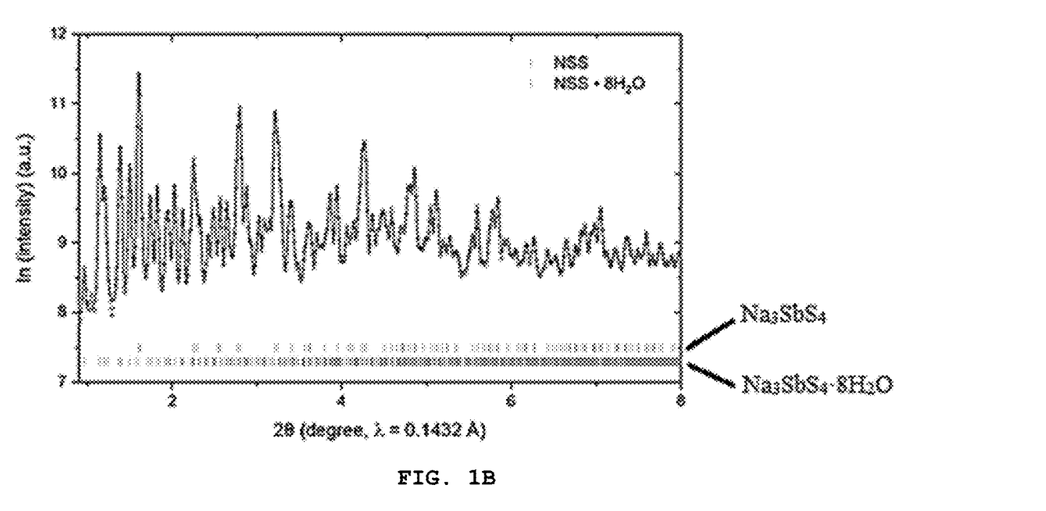
Figure 2A:
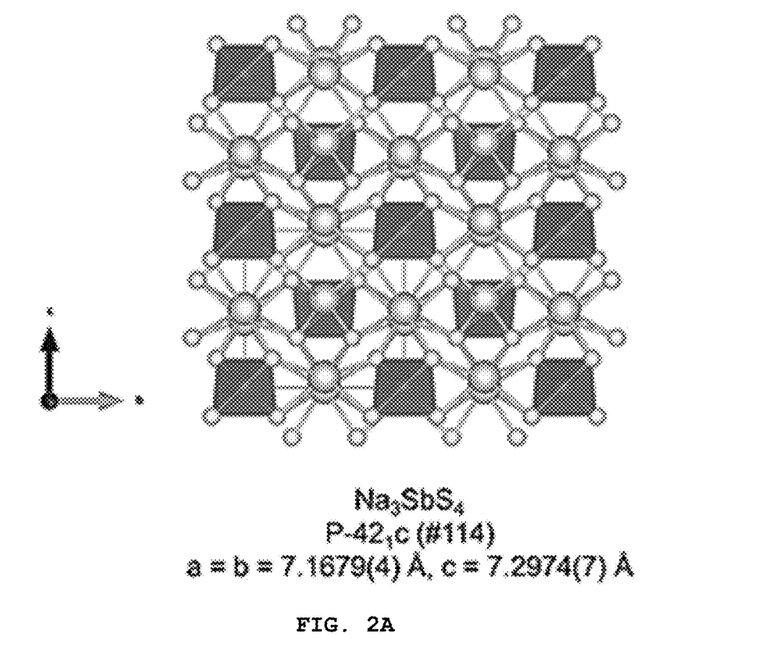
FIG. 2A-B shows the crystal structures viewed along the [100] direction and the space group and lattice parameters of (A) $Na_3SbS_4$ and (B) $Na_3SbS_4 \cdot 8H_2O$.
Figure 2B:
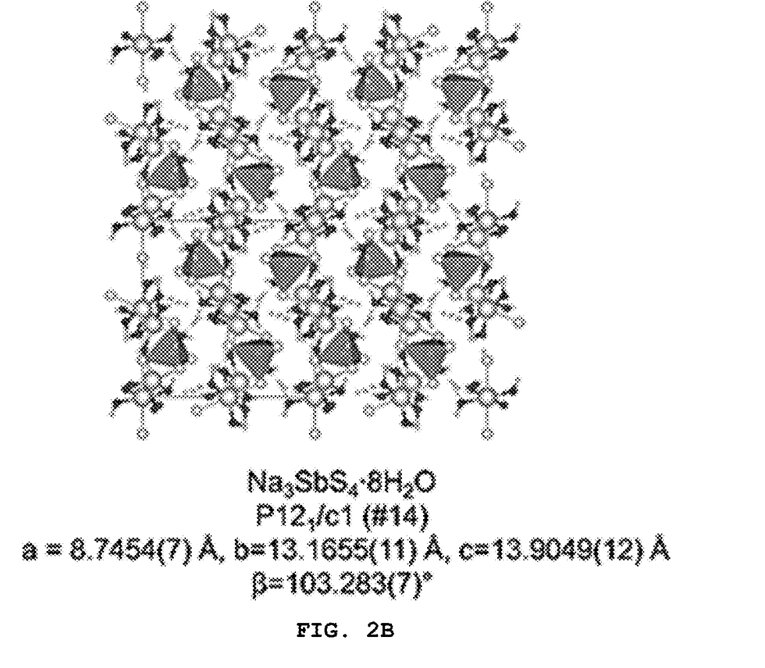

X-ray diffraction (XRD) patterns in FIG. 1a show the structural evolution of $Na_3SbS_4$ upon air exposure. $Na_3SbS_4.8H_2O$ is observed after two minutes of air exposure in FIG. 1a. During the first 15 minutes of air exposure, the amount of $Na_3SbS_4.8H_2O$ continuously grows, while the amount of $Na_3SbS_4$ decreases. After 30 minutes of air exposure, both $Na_3SbS_4$ and $Na_3SbS_4.8H_2O$ further evolved into $Na_3SbS_4.9H_2O$. As shown in the Rietveld fitting of the synchrotron XRD data obtained from exposing $Na_3SbS_4$ in air for 15 minutes in FIG. 1b, the diffraction pattern can be modeled very well with a two-phase mixture of $Na_3SbS_4.8H_2O$ and $Na_3SbS_4$, with the former as the dominant phase (>85 wt %). The high-quality diffraction data exhibits excellent counting statistics even at a d-spacing of ~0.69 Å, allowing an accurate structural determination of the new $Na_3SbS_4.8H_2O$ phase. The structural parameters of the as-prepared $Na_3SbS_4.8H_2O$ as determined from the Rietveld refinement of the synchrotron XRD data are presented in Table 1 and 2. A DFT calculation of thermodynamic stability for the as-refined $Na_3SbS_4 \cdot 8H_2O$ structure suggests that only 11 meV/atom of energy is released by decomposition to the most stable set of phases at that composition. This energy is well-within the threshold of entropic stabilization at room temperature and confirms that this phase should be attainable.

Figure 3:
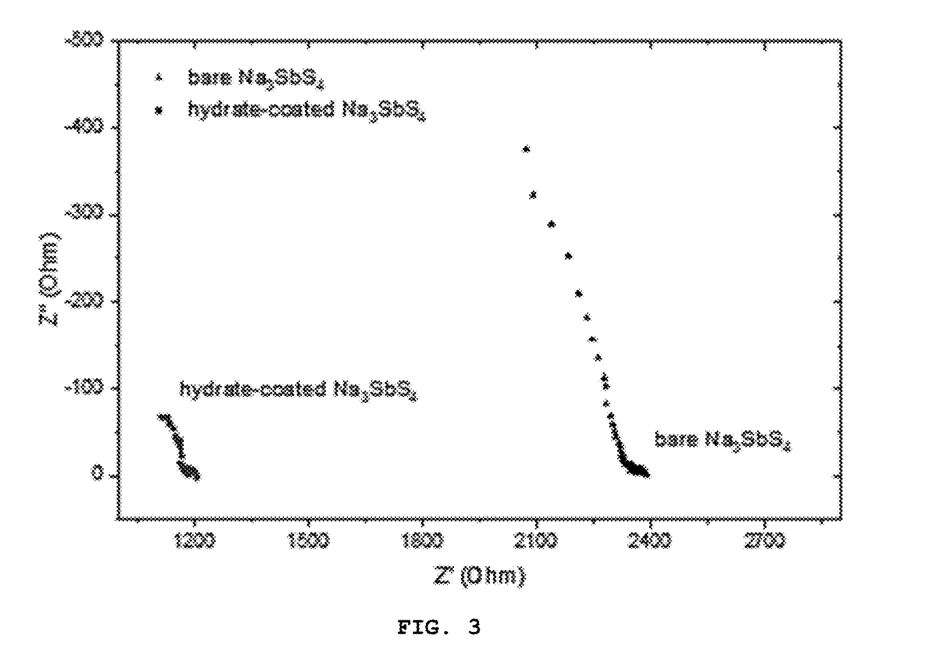
FIG. 3 shows the EIS profiles for $Na/Na_3SbS_4/Na$ symmetric cells with and without hydrate coating before cycling.

EIS profiles of the symmetric $Na/Na_3SbS_4$ cells with and without a hydrate coating are shown in FIG. 3, which is characterized by a finite-length high-frequency semicircle (due to the high frequency limit of the instrument) and by a Warburg impedance at low frequencies. The resistance of the bulk SE can be determined from the high-frequency x-intercepts, and the first finite-length arc likely represents the overall impedances from both grain boundary and the interfaces. As shown in FIG. 3, the symmetric Na non-blocking $Na_3SbS_4$ cells with a hydrate protection layer deliver a smaller interface impedance compared with the bare use of $Na_3SbS_4$ as the SE. Due to the limited quality of the data, the Nyquist plots were only used for qualitative analysis and comparison.

Figure 4:
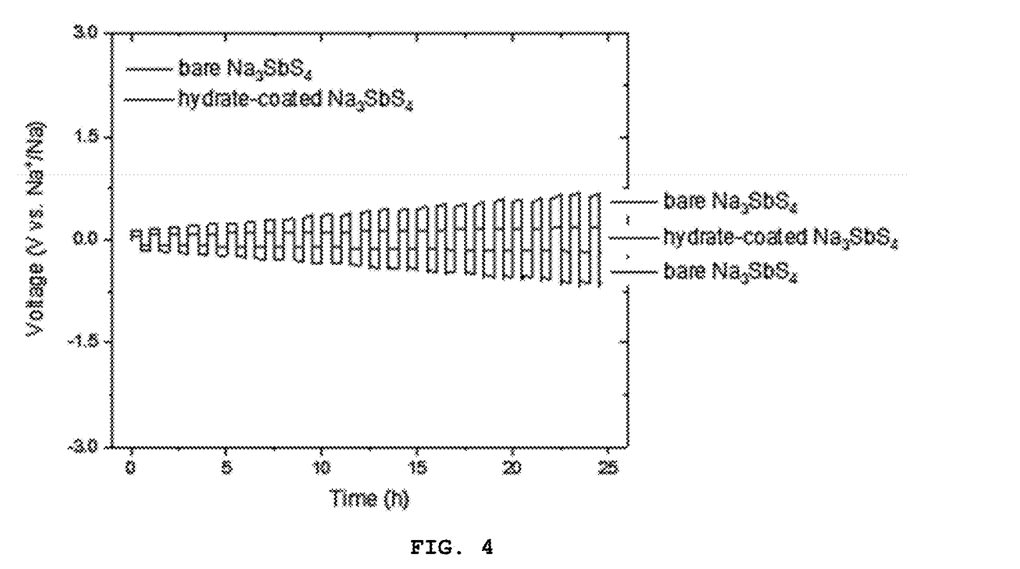
FIG. 4 shows Galvanostatic cycling of Na $Na_3SbS_4$/Na symmetric cells with and without hydrate coating with a current density of 0.1 mA cm$^{-2}$.

To further investigate the impedance and ion transport properties of the $Na/Na_3SbS_4$ interface, D.C. Na plating and stripping experiments were carried out by electrochemically cycling the symmetric cells at a constant current. In this way, electrochemically deposited fresh Na metal was continuously generated during cycling which would continue reacting with $Na_3SbS_4$ if the SEI is not perfectly passivating. As shown in FIG. 4, a smaller polarization was observed with the hydrate protection than that of the bare (i.e. non-hydrate-protected) $Na_3SbS_4$ (0.0613 V at the $1^{st}$ cycle and 0.1865 V at the 25th cycle, compared to 0.1219 V at the $1^{st}$ cycle and 0.6582 V at the 25th cycle with the use of bare $Na_3SbS_4$). This confirms that both lower interfacial impedance and a more stable interface during Na cycling were obtained with the $Na_3SbS_4 \cdot 8H_2O$ protection layer. First-principles density functional theory (DFT) calculations were used to examine the stability of $Na_3SbS_4$ and $Na_3SbS_4 \cdot 8H_2O$ against Na metal. Specifically, the most thermodynamically favorable reactions (if any) occurring between the SE and a Na metal reservoir were calculated. An accurate calculation of (electro) chemical reactions between the SE and Na metal requires thermochemical data for all possible reaction products. Thermochemical data for known phases were obtained in the Na—Sb—S—O—H chemical system from the Materials Project database. Both $Na_3SbS_4$ and $Na_3SbS_4 \cdot 8H_2O$ were found to release energy upon reaction with Na metal, indicating instability against the anode. However, the reaction products differ between the dry and hydrated phases. Table 1 summarizes the results of the DFT calculations.

TABLE 1

DFT-predicted products and energies for the reaction of dry and hydrated $Na_3SbS_4$ solid electrolytes with Na metal.

| Solid Electrolyte | Reaction with Na | Reaction Energy (eV/atom) |
| --- | --- | --- |
| $Na_3SbS_4$ | $Na_3SbS_4 + 8Na \rightarrow Na_3Sb + 4Na_2S$ | −1.7 |
| $Na_3SbS_4 \cdot 8H_2O$ | $Na_3SbS_4 \cdot 8H_2O + 40Na \rightarrow 16NaH + 8Na_2O + 4Na_2S + Na_3Sb$ | −0.6 |

TABLE 2

Crystallographic data for $Na_3SbS_4 \cdot 8H_2O$ based on the Rietveld refinement of the synchrotron XRD data

| Radiation | Synchrotron X-Ray (11-ID-B, APS) |
| --- | --- |
| Wavelength of X-ray | 0.1432 Å |
| Crystal system | Monoclinic |
| Space group | $P12_1/c1$ (#14) |
| Lattice parameters | a = 8.7458(8) Å |
|  | b = 13.1683(1) Å |
|  | c = 13.9062(1) Å |
|  | β = 103.282(9) ° |
| Cell Volume | 1558.7(3) Å$^3$ |
| Calc. density | 1.97333 g/cm$^3$ |
| $R_{wp}$ | 4.399 |
| $\chi^2$ | 1.432 |

TABLE 3

Atomic site information for $Na_3SbS_4 \cdot 8H_2O$. The atomic coordinate for hydrogen atoms were adopted from the isostructural compound of $Na_3AsS_4 \cdot 8H_2O$, and were fixed during the refinement.

| Atom | Wyck. | Site | x/a | y/b | z/c |
| --- | --- | --- | --- | --- | --- |
| Na1 | 2d | −1 | 1/2 | 0 | 1/2 |
| Na2 | 2a | −1 | 0 | 0 | 0 |
| Na3 | 4e | 1 | 0.169(3) | 0.564(2) | 0.084(3) |
| Na4 | 4e | 1 | 0.658(3) | 0.0494(19) | 0.086(2) |
| Sb | 4e | 1 | 0.2820(6) | 0.1698(4) | 0.2495(5) |
| S1 | 4e | 1 | 0.208(2) | −0.0002(11) | 0.2085(1) |
| S2 | 4e | 1 | 0.4039(19) | 0.1872(18) | 0.4243(1) |
| S3 | 4e | 1 | 0.4698(19) | 0.2132(13) | 0.1596(1) |
| S4 | 4e | 1 | 0.073(2) | 0.2812(12) | 0.2157(1) |
| O1 | 4e | 1 | 0.09119 | 0.38977 | 0.0008(6) |
| O2 | 4e | 1 | 0.14605 | 0.51933 | 0.2508(5) |
| O3 | 4e | 1 | 0.14888 | 0.65019 | 0.4662(7) |
| O4 | 4e | 1 | 0.19527 | 0.39663 | 0.4591(4) |
| O5 | 4e | 1 | 0.21189 | 0.73432 | 0.1490(1) |
| O6 | 4e | 1 | 0.40900 | 0.46034 | 0.1453(6) |
| O7 | 4e | 1 | 0.53093 | 0.42688 | 0.4108(6) |
| O8 | 4e | 1 | 0.73931 | 0.40236 | 0.0655(0) |
| H01 | 4e | 1 | 0.04674 | 0.53486 | 0.2669(9) |
| H02 | 4e | 1 | 0.07532 | 0.69039 | 0.4180(3) |
| H03 | 4e | 1 | 0.09599 | 0.35007 | 0.0606(1) |
| H04 | 4e | 1 | 0.13807 | 0.74534 | 0.1904(2) |
| H05 | 4e | 1 | 0.14681 | 0.44537 | 0.2519(4) |
| H06 | 4e | 1 | 0.16799 | 0.13989 | 0.4688(1) |
| H07 | 4e | 1 | 0.17391 | 0.80938 | 0.1026(6) |
| H08 | 4e | 1 | 0.17667 | 0.34779 | 0.4050(5) |
| H09 | 4e | 1 | 0.25892 | 0.14099 | 0.1014(3) |
| H10 | 4e | 1 | 0.41115 | 0.38639 | 0.1462(1) |
| H11 | 4e | 1 | 0.50208 | 0.47942 | 0.1949(2) |
| H12 | 4e | 1 | 0.49548 | 0.35749 | 0.3951(3) |
| H13 | 4e | 1 | 0.60649 | 0.44308 | 0.3719(2) |
| H14 | 4e | 1 | 0.68646 | 0.23245 | 0.3048(0) |
| H15 | 4e | 1 | 0.71145 | 0.33204 | 0.0747(2) |
| H16 | 4e | 1 | 0.77352 | 0.43011 | 0.1319(5) |

The formation of a stable interface is due to the production of $Na_2O$ and NaH, which only occur as a result of reaction with the hydrated SE (Table 1). Using the same thermodynamic methodology as the one applied above, the $Na_2O$ and NaH, both wide-bandgap electronic insulators, were calculated to be stable against Na metal. Furthermore, prior experimental and theoretical works indicate that these phases exhibit relatively high Na$^+$ conductivity. The formation of $Na_2O$ and NaH likely yields an ideal passivating interface (high ionic conductivity and electronically insulating). It is also believed that the growth of the interface impedance is positively correlated with the fraction of the mixed conducting phase in the decomposition products, e.g., $Na_3Sb$ in the current system. Since the molar ratio of $Na_3Sb$ sharply decreases from approximately 20% to 3% when the hydrate protection is used based on calculation results in Table 1, the interface impedance growth is expected to be much slower.

Figure 5A:
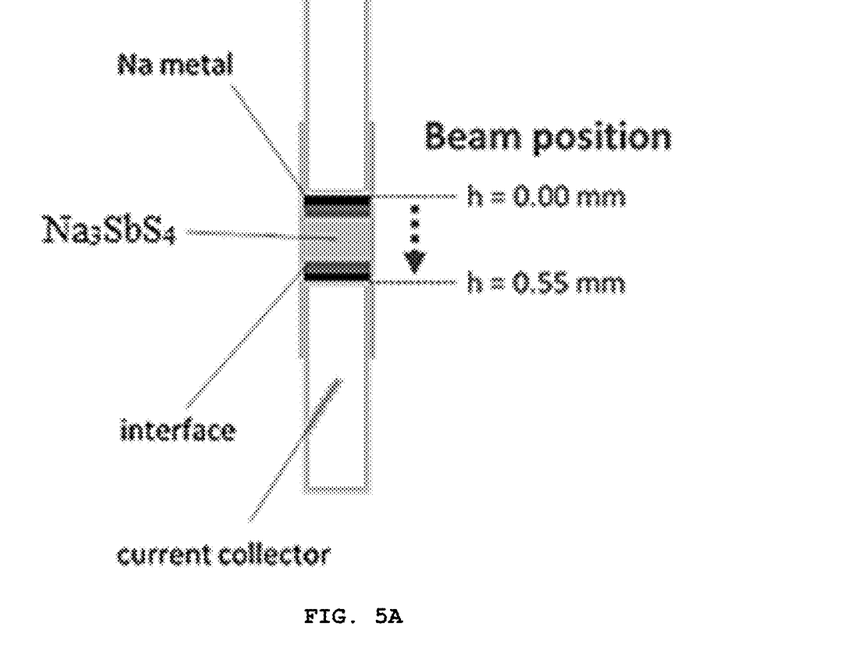
FIG. 5A-C shows (A) a schematic of the spatially resolved in-depth post-operando XRD measurements, (B) spatially-resolved (along the cell's vertical axis) XRD profiles of post-operando $Na/Na_3SbS_4/Na$ symmetric cell, and (C) XRD profile of the interface between Na metal and $Na_3SbS_4$.
Figure 5B:
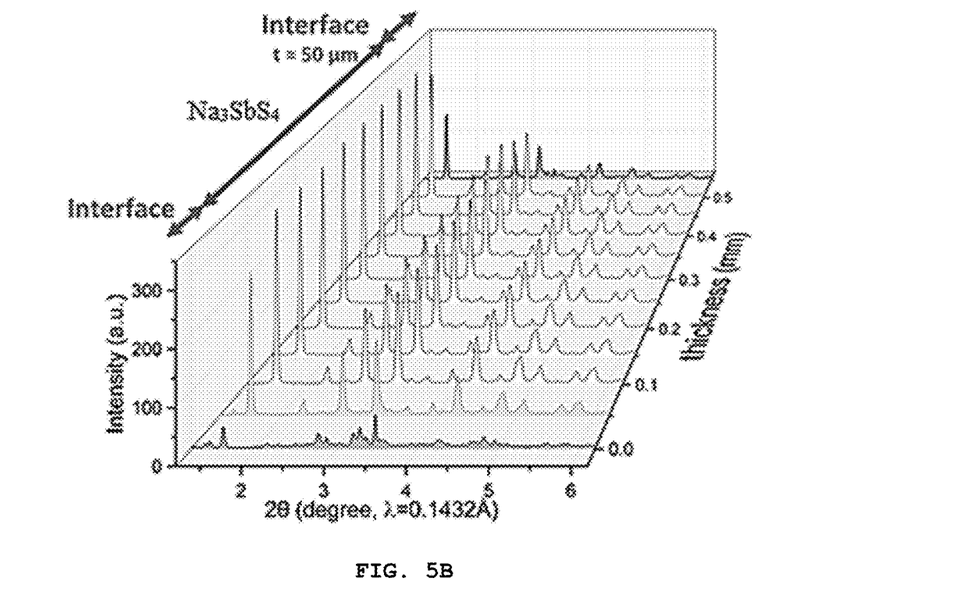
Figure 5C:
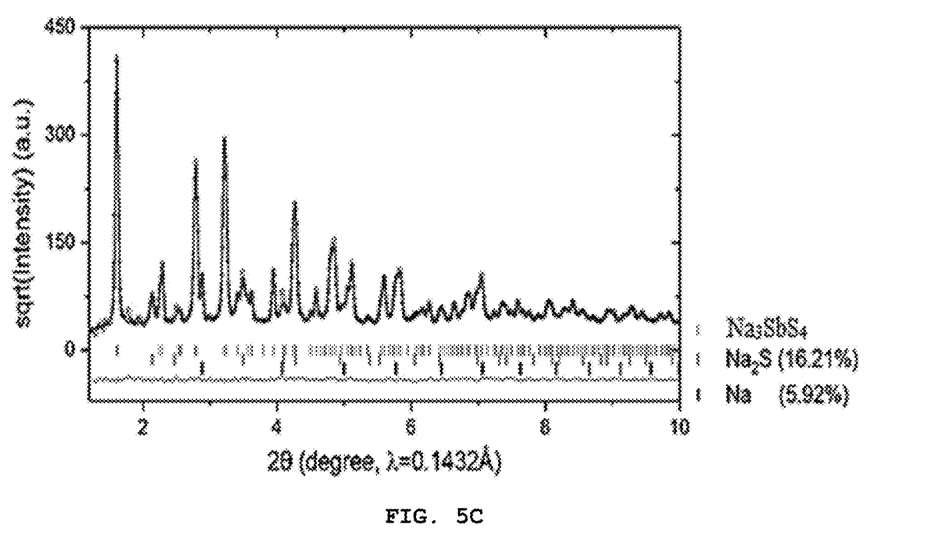
Figure 6A:
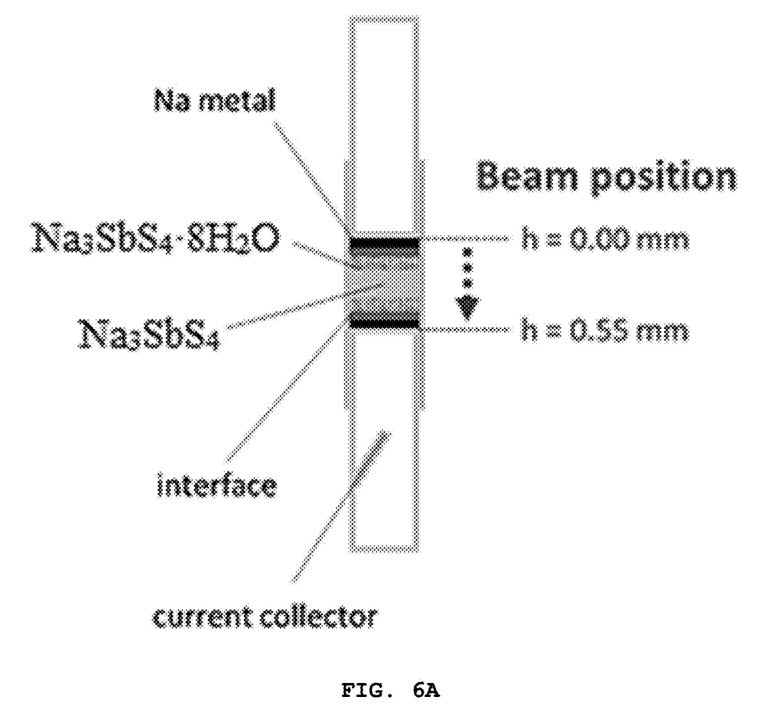
FIG. 6A-C shows (A) Schematic of the spatially resolved in-depth post-operando XRD measurements with hydrate-coated $Na_3SbS_4$ as SE, (B) spatially-resolved (along the cell's vertical axis) XRD profiles of post-operando $Na/Na_3SbS_4/Na$ with hydrate coating symmetric cell, and (C) XRD profile of the interface between Na metal and $Na_3SbS_4 \cdot 8H_2O$.
Figure 6B:
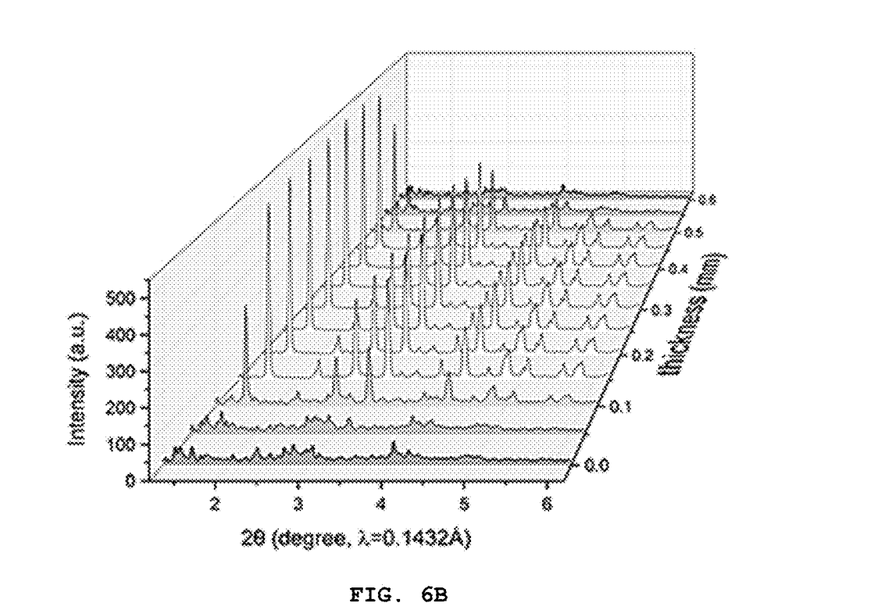
Figure 6C:
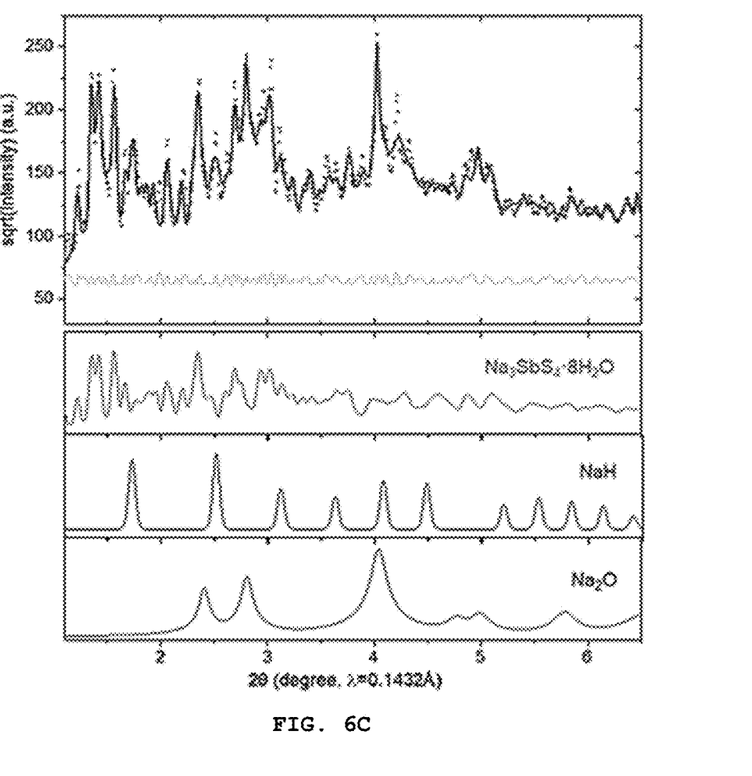

Spatially resolved in-depth post-operando XRD patterns for both the non-coated and hydrate-coated symmetric cells are shown in FIGS. 5 and 6, respectively. Schematics of the experimental set-up are shown in FIGS. 5a and 6a. FIG. 5b displays XRD patterns collected at different positions along the vertical axis of the Na/Na$_3$SbS$_4$ (unprotected)/Na symmetric cell. In FIG. 5c, the different regions of the cell are colored differently. Diffraction patterns corresponding to the interfacial regions are blue and diffraction patterns corresponding to the bulk SE are grey (bottom line). Because of the limitation of the beam size (50 μm in the vertical direction), XRD collected at the positions of the interface also include contributions from Na metal or Na$_3$SbS$_4$SE. All Bragg reflections from the bulk SE can be indexed to Na$_3$SbS$_4$, suggesting the perfect sealing of the cell. Both Na metal and Na$_2$S can be found in the Na/Na$_3$SbS$_4$ interface (FIG. 5c), in agreement with the calculation results.

Similarly, the XRD patterns containing the information of the Na/Na$_3$SbS$_4$ (hydrate protected) interfaces were colored in green, and the patterns for bulk Na$_3$SbS$_4$ solid electrolyte is colored in grey in FIG. 6b. Three XRD patterns containing the contribution from the hydrate phase can be observed, indicating the thickness of the Na$_3$SbS$_4$.8H$_2$O protection layer is on the order of 100 to 150 μm. When a detailed Rietveld refinement was performed, only the first 100 μm layers which are closest to Na metal contains decomposition products, such as NaH and Na$_2$O, and Na$_3$SbS$_4$.8H$_2$O as the dominant phase. The 3rd closest layer contains a two-phase mixture of Na$_3$SbS$_4$.8H$_2$O and Na$_3$SbS$_4$. Na$_3$SbS$_4$ is the only phase observed in the deeper layers. On the basis of the computational results, the production of NaH and Na$_2$O is a result of the reaction between Na metal and the hydrate. These results suggest that the reaction between Na metal and the hydrate is only limited to the first 100 μm.

The invention claimed is:

1. A sodium-ion battery, comprising:
   an electrode having an active material;
   an interlayer comprising a passivation function and comprising a general formula Na$_3$AX$_4$·8H$_2$O, wherein A=P or Sb and wherein X=S or Se; and
   a solid electrolyte medium in contact with a passivation layer.

2. The battery of claim 1, wherein the interlayer inhibits an electron pathway between the solid electrolyte and the active material.

3. The battery of claim 1, wherein the active material is a sodium metal material.

4. The battery of claim 1, wherein the solid electrolyte material has the general formula Na$_3$AX$_4$ (A=P or Sb, X=S or Se).

5. The battery of claim 1, wherein the solid electrolyte is Na$_3$SbS$_4$ and the interlayer is Na$_3$SbS$_4$·8H$_2$O.

6. The battery of claim 1, wherein the solid electrolyte and interlayer are selected from:
   (i) Na$_3$PS$_4$ and Na$_3$PS$_4$·8H$_2$O;
   (ii) Na$_3$PSe$_4$ and Na$_3$PSe$_4$·8H$_2$O; and
   (iii) Na$_3$SbSe$_4$ and Na$_3$SbSe$_4$·8H$_2$O.

7. The battery of claim 1, wherein the electrode is a positive electrode or a cathode.

8. A battery comprising:
   a sodium metal electrode;
   an interlayer comprising a passivation function and comprising a general formula Na$_3$AX$_4$·8H$_2$O, wherein A=P or Sb and wherein X=S or Se; and
   a solid electrolyte medium in contact with a passivation layer and wherein the interlayer is between the solid electrolyte medium and the sodium metal electrode.

9. The battery of claim 8, wherein the interlayer inhibits an electron pathway between the solid electrolyte and the sodium metal electrode.

10. The battery of claim 8, wherein the solid electrolyte material has the general formula Na$_3$AX$_4$ (A=P or Sb, X=S or Se).

11. The battery of claim 8, wherein the solid electrolyte is Na$_3$SbS$_4$ and the interlayer is Na$_3$SbS$_4$·8H$_2$O.

12. The battery of claim 8, wherein the solid electrolyte and interlayer are selected from:
   (i) Na$_3$PS$_4$ and Na$_3$PS$_4$·8H$_2$O;
   (ii) Na$_3$PSe$_4$ and Na$_3$PSe$_4$·8H$_2$O; and
   (iii) Na$_3$SbSe$_4$ and Na$_3$SbSe$_4$·8H$_2$O.

13. A method of making a battery of claim 1, comprising preparing a solid electrolyte material;
   exposing the solid electrolyte material to an environment under conditions to obtain a passivation layer on the solid electrolyte material;
   placing/layering an anode Na metal electrode material in contact with the passivation layer;
   placing/layering a cathode electrode material in contact with the passivation layer; and
   placing a current collector on each of the cathode electrode material and the anode Na metal electrode material.

14. The method of claim 13, wherein in the cathode material is a carbon or graphite.

15. The method of claim 13, wherein the current collector material is Cu, Al, or steel.

16. A system, comprising:
   a sodium-ion battery of claim 1; and
   electronics for controlling the discharge of the battery.

* * * * *